United States Patent
Blackburn et al.

(10) Patent No.: US 6,188,940 B1
(45) Date of Patent: Feb. 13, 2001

(54) METHOD AND APPARATUS FOR DETERMINING TIME TO FIRE AN OCCUPANT RESTRAINT SYSTEM USING OCCUPANT SENSOR INPUTS

(75) Inventors: Brian Blackburn, Rochester; Joseph R. Brown, Grosse Ile; Joseph F. Mazur, Washington; Scott B. Gentry, Romeo, all of MI (US)

(73) Assignee: Ford Global Technologies, Inc., Dearborn, MI (US)

(*) Notice: Under 35 U.S.C. 154(b), the term of this patent shall be extended for 0 days.

(21) Appl. No.: 09/190,595

(22) Filed: Nov. 12, 1998

(51) Int. Cl.$^7$ .............................. B60R 22/00; G06F 17/00
(52) U.S. Cl. ................................ 701/45; 701/46; 280/735
(58) Field of Search ....................... 701/45, 46; 280/735

(56) References Cited

U.S. PATENT DOCUMENTS

| | | |
|---|---|---|
| 5,413,378 | 5/1995 | Steffens, Jr. et al. . |
| 5,439,249 | 8/1995 | Steffens, Jr. et al. . |
| 5,626,359 | 5/1997 | Steffens, Jr. et al. . |
| 5,928,300 | * 7/1999 | Rogers et al. ............... 701/45 |
| 5,991,234 | * 11/1999 | Sejalon et al. ............... 367/13 |
| 6,020,812 | * 2/2000 | Thompson et al. ......... 340/438 |
| 6,036,225 | * 3/2000 | Foo et al. .................... 280/735 |
| 6,056,079 | * 5/2000 | Cech et al. .................. 180/273 |

* cited by examiner

Primary Examiner—William A. Cuchlinski, Jr.
Assistant Examiner—Ronnie Mancho
(74) Attorney, Agent, or Firm—David B. Kelley

(57) ABSTRACT

A method for sensing the occurrence of a vehicle crash is provided for a vehicle having an occupant restraint system operatively connected with a crash sensor having an accelerometer, which produces an accelerometer signal, and with an occupant position sensor which produces a position signal. The crash sensor includes an adjustable filter. The method includes the steps of: a) calculating an estimated occupant displacement by integrating the accelerometer signal twice; b) comparing the estimated occupant displacement to the position signal; and c) adjusting the adjustable filter based upon the comparing step to optimize control of the occupant restraint system. In this manner, actual body position of the occupant may be more accurately predicted and measured, which allows optimization of air bag deployment.

7 Claims, 6 Drawing Sheets

METHOD AND APPARATUS FOR DETERMINING TIME TO FIRE AN OCCUPANT RESTRAINT SYSTEM USING OCCUPANT SENSOR INPUTS

TECHNICAL FIELD

The present invention relates to a method and apparatus for optimizing firing time of an occupant restraint system, and more particularly to an advanced restraint system algorithm using occupant sensor inputs to modify firing time of an air bag.

BACKGROUND OF THE INVENTION

The objective of an advanced restraint system is to provide an optimal protection system for an occupant involved in a vehicle impact. Until now, the systems involved in the task of restraining an occupant have all worked independently without any feedback between systems. A popular design uses a seat belt system that is designed to do the majority of the work of restraining an occupant. An air bag is deployed based on a vehicle crash pulse generated during a crash, which is sensed by a crash sensor. Deployment occurs at 30 ms prior to the point at which a properly seated, properly positioned occupant is expected to have moved five inches (or 500 mm). The air bag provides a restraining force that supplements the seat belt restraint.

The ideal system would have the seat belt start restraining the occupant until a certain load limit is reached. At that point, the air bag would have been deployed by the crash sensor and be ready to provide a supplemental restraining force.

To accomplish this system objective, occupant sensors have been proposed that provide feedback to a control system independently of the crash sensor and prevent or augment deployment of the air bag restraint if the occupant is out of position. However, this does not incorporate the crash sensor into a control loop, but rather the control algorithms still fire the air bag based upon the vehicle-specific 5–30 rule for time to fire (TTF), as explained above, is the crash sensor and occupant sensor work independently.

The crash sensor accelerometer does not always provide an accurate estimate of the occupant's "free body motion". Also, it is well known that crash algorithms use various integral methods to estimate occupant movement, but these estimates do not incorporate real time feedback of occupant position.

It is desirable to provide a system which more accurately determines the "free body motion" of the vehicle occupant so that the optimal firing time of the air bag can be more accurately determined.

DISCLOSURE OF THE INVENTION

The present invention overcomes the above-referenced shortcomings of prior systems by using the occupant position sensors to augment the crash sensor accelerometer firing decision. In order to make the system truly adaptive, and closed loop, the firing decision is based upon the sensed occupant position as a supplement to the crash sensor accelerometer signal. In this manner, the air bag will be provided at the exact time when the specific occupant requires it.

More specifically, the present invention provides a method for sensing the occurrence of a vehicle crash in a vehicle having an occupant restraint system operatively connected with a crash sensor having an accelerometer which produces an accelerometer signal (or crash signal), and with an occupant position sensor which produces a position signal. The crash sensor includes an adjustable filter. The method comprises the steps of:

A. Calculating an estimated occupant displacement by integrating the accelerometer signal twice;

B. Comparing the estimated occupant displacement to the position signal; and

C. Adjusting the adjustable filter based upon the comparing step so that the estimated occupant displacement closely correlates with the position signal, thereby optimizing control of the occupant restraint system.

An apparatus is also provided for controlling an occupant restraint system having an air bag, the apparatus including a crash sensor accelerometer for measuring vehicle deceleration and producing an accelerometer signal (or crash signal); an occupant position sensing system for measuring occupant position and producing a position signal; and a controller operatively connected to the crash sensor accelerometer and occupant position sensing system, wherein the controller incorporates an algorithm for determining an appropriate time to fire the air bag based upon the accelerometer and position signals.

Preferably, the step of adjusting the adjustable filter is performed such that lower frequencies of acceleration are twice integrated, which provides optimal firing of the air bag. In other words, the adjustment comprises using lower frequency high pass filter coefficients if the position signal leads the estimated occupant displacement, and using higher frequency high pass filter coefficients if the position signal lags the estimated occupant displacement.

Accordingly, an object of the invention is to use the occupant position sensor in conjunction with the crash sensor accelerometer to augment the occupant restraint firing system.

A further object of the invention is to create an adaptive, closed loop control system which adjusts a crash sensor filter based upon a comparison between the double integral of the crash sensor accelerometer and the occupant position sensor signal.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
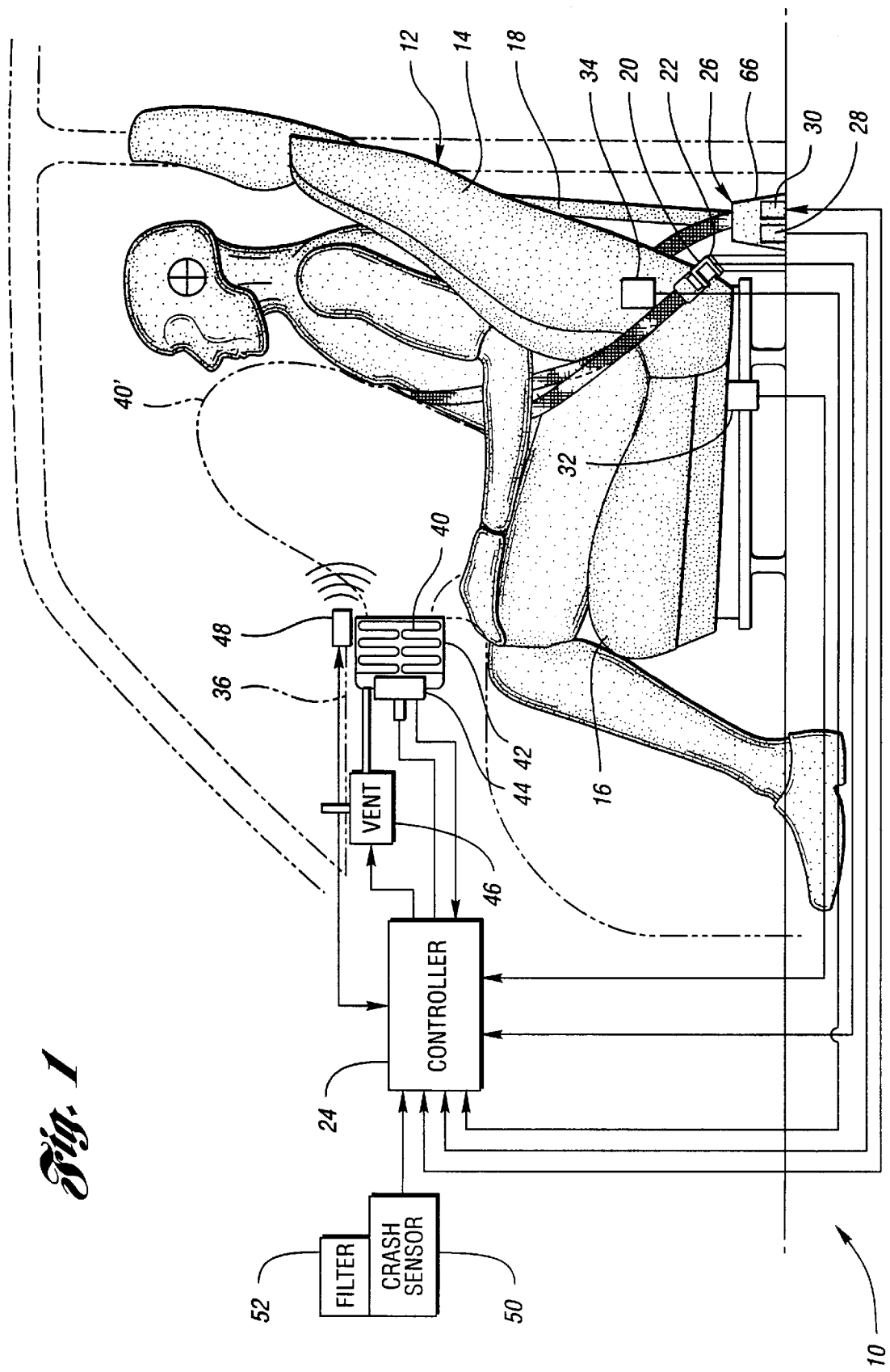
FIG. 1 shows a schematic side view of a vehicle incorporating an advanced restraint system in accordance with the present invention.

Referring to FIG. 1, a vehicle 10 is shown schematically incorporating an advanced restraint system in accordance with the present invention. The system shown in FIG. 1 is for illustrative purposes only, and is not intended to be limiting. It is understood that the present invention may be used with a wide variety of occupant restraining systems.

As shown, the vehicle 10 includes a seat 12 having a seat back 14 and a lower seat 16. A seat belt 18 is attached to a belt buckle 20 including a switch 22 operatively connected to a main controller 24. The seat belt 18 is also connected to a floor mount 26, which incorporates a belt payout sensor 28 and a belt controller 30, which are each electrically connected to the main controller 24. The seat 12 also includes a seat position sensor 32, and a seat back angle sensor 34, each of which are connected to the main controller 24. Any variety of sensors may be used with the present invention, such as infrared sensors, etc.

The vehicle 10 also includes an instrument panel 38 having an inflatable air bag 40 mounted within a housing 42, and deployable by an inflator 44 for deploying the air bag to the inflated position 40', shown in phantom in FIG. 1. A venting device 46 is provided in communication with the housing 44 for venting a desired amount of inflation fluid away from the air bag 40 to facilitate a desired inflation amount.

The instrument panel 36 also includes an occupant position sensor 48 which is in electrical communication with the controller 24, and a crash sensor 50 including an accelerometer, which is also electrically connected with the controller 24. Of course, an occupant position sensor may be used for sensing a driver or passenger position. The crash sensor 50 also includes an adjustable filter 52 associated with the accelerometer.

Details regarding the structure and function of the various components listed above, as well as additional supporting background disclosure, may be found in U.S. Pat. Nos. 5,413,378, 5,439,249, 5,546,307, 5,537,422, and 5,626,359, each of which are hereby incorporated by reference in their entirety.

The present invention is particularly characterized in the algorithm of the controller 24 which uses signals from the occupant position sensors 36,48 and the crash sensor 50 to improve timeliness of air bag deployment. In particular, a dynamic occupant position sensing system in accordance with the present invention determines the occupant's instantaneous position and continuously compares this measured signal with the second integral of the crash sensor accelerometer 50 signal, which estimates the free body position of the occupant. As used herein, the term "second integral" may refer to an appropriate analog or digital calculation, or may be determined by a mathematical model of any kind.

Figure 2:
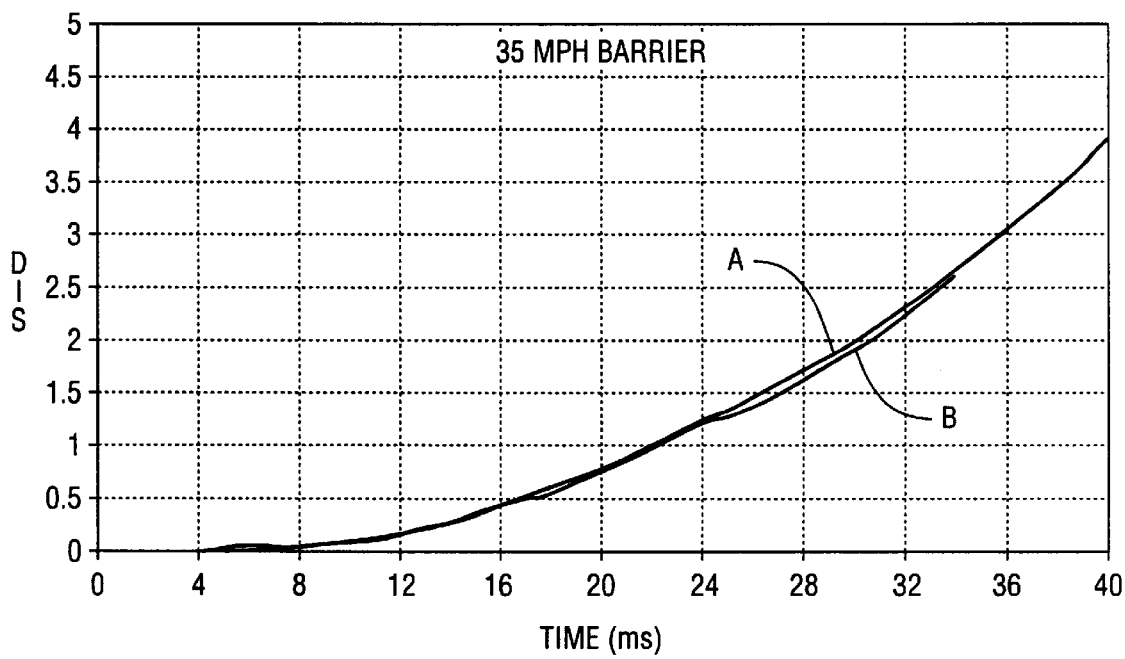
FIG. 2 shows a graphical illustration of displacement vs. time for a 35 mph barrier test.

By way of background information, FIG. 2 shows a displacement versus time graphical illustration of actual head position (line A) with the second integral of the acceleration signal from a crash sensor (line B). It is apparent from this illustration that, for a 35 mph barrier crash, the two measurements track each other almost identically throughout the crash event.

Figure 3:
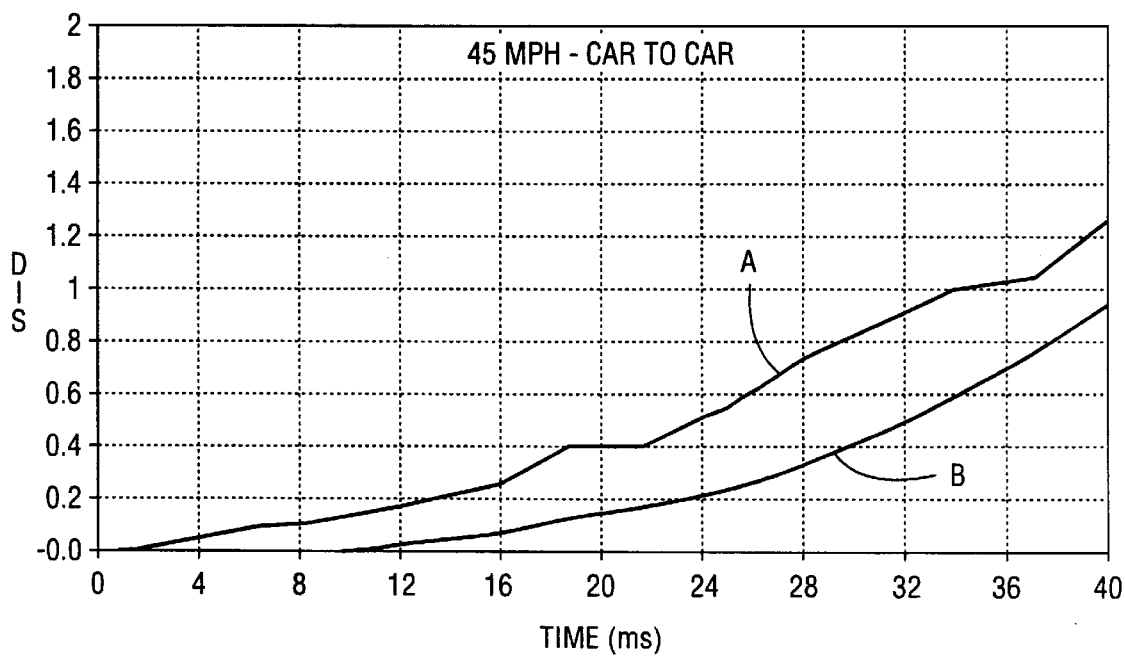
FIG. 3 shows a graphical illustration of displacement vs. time for a 45 mmph car-to-car crash.

FIG. 3 shows the same two curves, but for a more "real world" event, namely a 45 mph car-to-car crash. In this event, the head position A leads the second integral B by as much as one inch, or 20% at the time to fire (TTF). One reason that this "lead" occurs is that the velocity change of the vehicle takes place over a longer period of time, which is more representative of a real-world crash as compared to a barrier crash. Other factors, such as whether the occupant is properly belted, in proper position, or not belted at all, will affect the lead or lag. This long velocity pulse allows for increased displacement of the occupant at lower deceleration values. In this situation, air bag deployment would be later than desired.

Another issue that exacerbates the above scenario is that in a single point electronic crash sensor, high pass filtering is required to reset or reestablish the integral and other algorithm calculations, which would further separate the two curves. This filtering is needed so that saturation does not occur due to the constants developed from integration. There exists no physical representation of a high pass filter in the real world. A high pass filter may be analogous to a magnet which pulls a ball back to its original position within a tube of a "ball and tube" crash sensor, which prevents a small event such as curb hop, from firing the air bag. The magnetic force is strong enough to pull the ball back into its original position. A high pass filter does the same to accelerometer data. For instance, the same curb hop event causes a pulse of acceleration, and without a high pass filter it would take only a few hundred milliseconds to reach a threshold to fire the air bag. Therefore, the data must be continuously reset to avoid such an inadvertent air bag firing.

The curb hop situation is an illustration of a condition in which implementation of the crash sensor technology cannot match the real world. Also, all such integration-type sensing must operate with the limitation that the integration data must be continuously reset.

The method by which continuous algorithmic systems, such as electronic crash sensors, implement high pass filtering is the major consideration. The cutoff frequency for high pass filtering is the critical choice. If a frequency is selected too high, one runs the risk of not being sensitive enough to long duration velocity change crashes because these lower frequency signals are attenuated by the filter. Conversely, if a cutoff frequency is selected which is too low, one runs the risk of easily reaching deployment thresholds due to inadvertent events, such as curb hop followed by a braking event.

Figure 4:
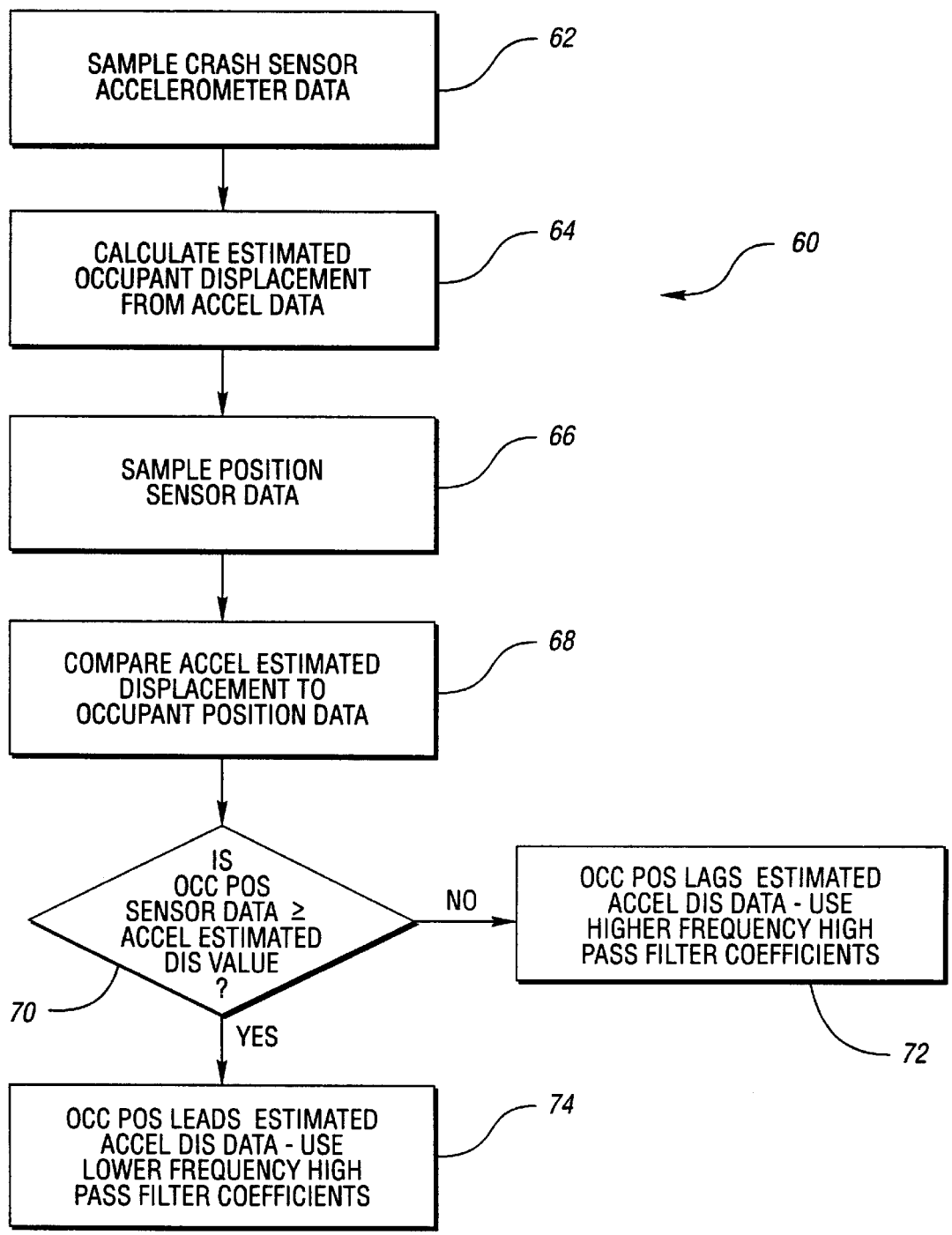
FIG. 4 shows a flow chart of a control algorithm for an advanced restraint system in accordance with the present invention.

The present invention contemplates the combination of examining the occupant's position and always comparing it to the second integral of the electronic crash sensor accelerometer 50. The control algorithm 60 for this strategy is shown in FIG. 4. At step 62, the crash sensor accelerometer data is sampled, and an estimated occupant displacement is calculated from the accelerometer data at step 64 by calculating the double integral of the accelerometer signal. At step 66, the occupant position sensor data is sampled, and this data is compared to the estimated displacement at step 68. At step 70, a determination is made whether the occupant position sensor data is greater than or equal to the accelerometer estimated displacement value. If the answer is "no", then the occupant position sensor lags the estimated accelerometer displacement data, and higher frequency high pass filter coefficients are selected for the adjustable filter 52, as illustrated at step 72. If the answer to decision block 70 is "yes", then the occupant position leads the estimated accelerometer displacement data, and lower frequency high pass filter coefficients are selected for the adjustable filter 52 at step 74.

For example, when the occupant position leads the second integral of the crash sensor accelerometer, one would employ an adaptive filtering method to adjust the value of the adjustable high pass filter frequency from its initial value. The high pass filter is shown as component 52 in FIG. 1. In this situation, with the occupant position leading the second integral of the crash sensor accelerometer signal, the high pass filter frequency is adjusted, for example, from 3 Hz down to 0.3 Hz. The 0.3 Hz and 3 Hz high pass frequency situations are illustrated graphically as force versus time in FIGS. 5 and 6, respectively. By adjusting from 3 Hz down to 0.3 Hz, a more sensitive algorithm is provided for sensing a long velocity duration crash, which is the type of crash that is more common in the field.

Figure 5:
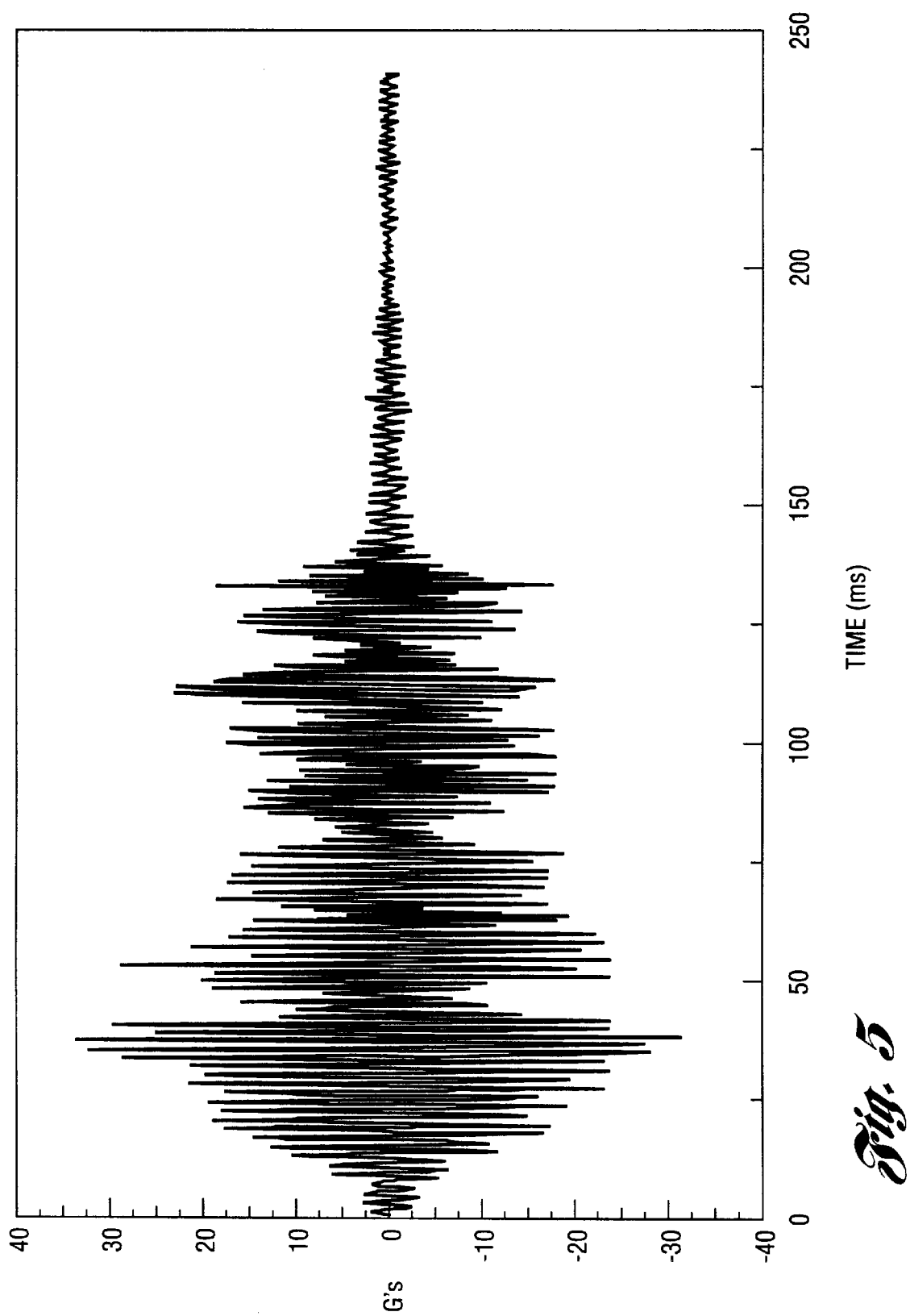
FIG. 5 shows a graphical illustration of force vs. time in an advanced restraint system implementing a 0.3 Hz high pass filter in accordance with the present invention.
Figure 6:
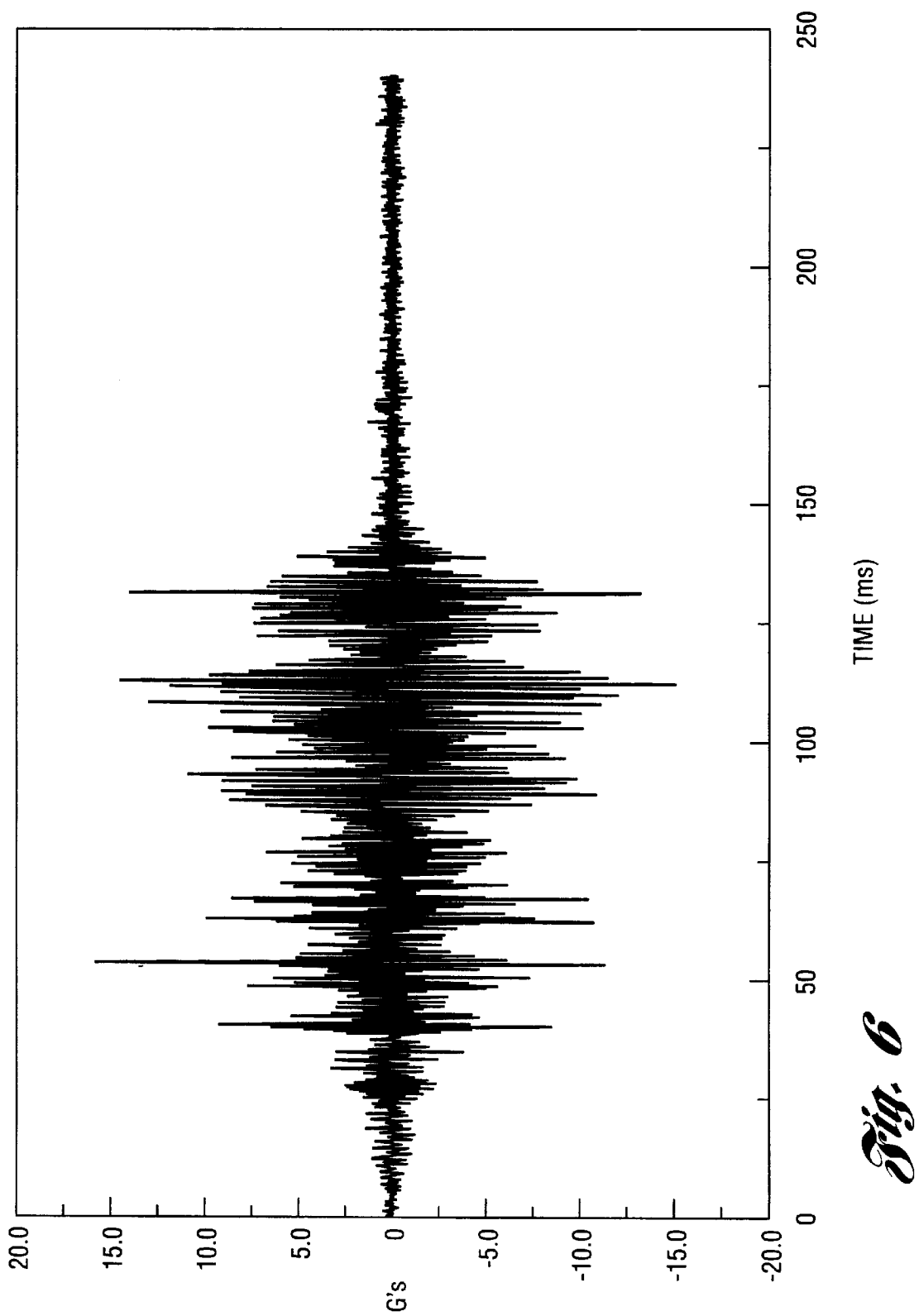
FIG. 6 shows a graphical illustration of force vs. time in an advanced restraint system implementing a 3 Hz high pass filter in accordance with the present invention.
Figure 7:
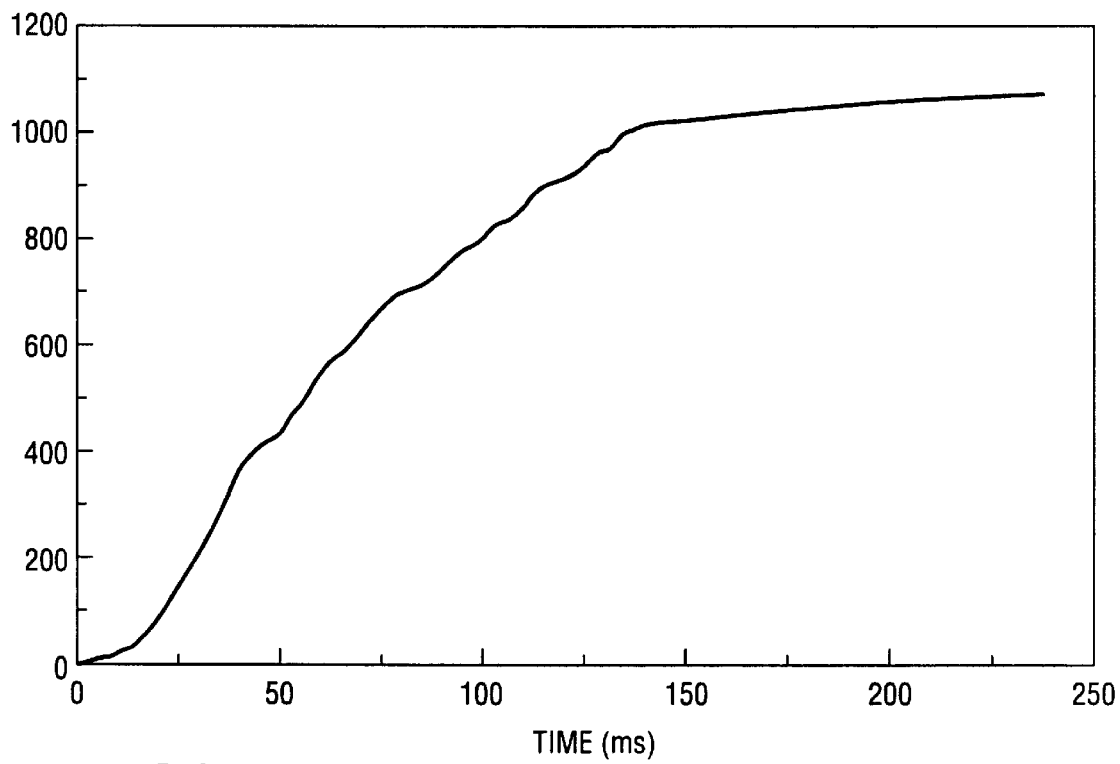
FIG. 7 illustrates velocity vs. time integrated from the data of FIG. 5.
Figure 8:
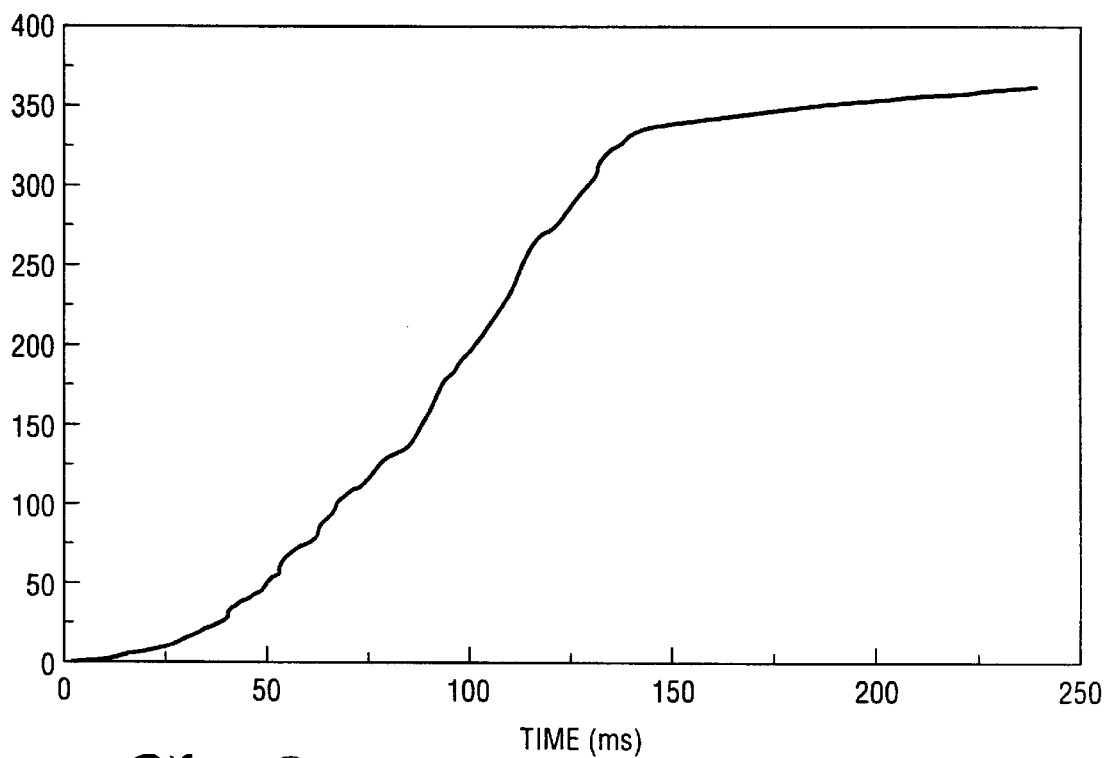
FIG. 8 shows velocity vs. time integrated from the data of FIG. 6.

FIGS. 7 and 8 are integrations of FIGS. 5 and 6, respectively. These graphs demonstrate the effect the different filters have on the velocity calculations, which are commonly used as crash sensor firing metrics. An overlay of FIGS. 7 and 8 would illustrate that the 3 Hz high pass filter frequency has more content removed from the signal in the mid-range than the 0.3 Hz high pass filter frequency, which is desirable when the occupant position lags the accelerometer displacement data.

The above-described algorithm improves the accuracy in predicting and measuring the occupant's pre-crash position in the vehicle, which optimizes an advanced restraint system by optimizing the time at which the air bag is deployed.

While the best mode for carrying out the invention has been described in detail, those familiar with the art to which this invention relates will recognize various alternative designs and embodiments for practicing the invention within the scope of the appended claims.

What is claimed is:

1. An apparatus for controlling an occupant restraint system including an air bag, the apparatus comprising:

a crash sensor having an accelerometer for producing a crash signal and including an adjustable filter;

an occupant position sensing system for measuring occupant position and producing a position signal; and a controller operatively connected to said crash sensor and occupant position sensing system, wherein the controller incorporates an algorithm for determining an appropriate time to fire the air bag based upon said crash signal and position signal, and wherein the algorithm is operative to perform the following steps:

calculating an estimated occupant displacement by integrating the crash signal twice;

comparing said estimated occupant displacement to the position signal; and adjusting the adjustable filter based up on said comparing step to determine the appropriate time to fire the air bag.

2. The apparatus of claim 1, wherein said algorithm operation of adjusting the adjustable filter comprises using lower frequency high pass filter coefficients if the position signal leads the estimated occupant displacement.

3. The apparatus of claim 1, wherein said algorithm operation of adjusting the adjustable filter comprises using higher frequency high pass filter coefficients if the position signal lags the estimated occupant displacement.

4. A method for sensing the occurrence of a vehicle crash in a vehicle having an occupant restraint system operatively connected with a crash sensor having an accelerometer which produces an accelerometer signal, and with an occupant position sensor which produces a position signal, wherein the crash sensor includes an adjustable filter, the method comprising:

calculating an estimated occupant displacement by integrating the accelerometer signal twice;

comparing said estimated occupant displacement to the position signal; and adjusting the adjustable filter based upon said comparing step so that said estimated occupant displacement closely correlates with the position signal, thereby optimizing control of the occupant restraint system.

5. The method of claim 4, wherein said step of adjusting the adjustable filter comprises using lower frequency high pass filter coefficients if the position signal leads the estimated occupant displacement.

6. The method of claim 4, wherein said step of adjusting the adjustable filter comprises using higher frequency high pass filter coefficients if the position signal lags the estimated occupant displacement.

7. A method for providing a passenger restraint actuation signal in a vehicle which includes a crash sensor having an accelerometer which produces an accelerometer signal, and an occupant position sensor which produces a position signal, wherein the crash sensor includes an adjustable filter, the method comprising:

calculating an estimated occupant displacement by integrating the accelerometer signal twice;

comparing said estimated occupant displacement to the position signal to determine whether a particular crash event is of long duration; and adjusting the adjustable filter to optimize early firing time of the occupant restraint system.

\* \* \* \* \*